United States Patent
Liu et al.

(10) Patent No.: US 10,052,582 B1
(45) Date of Patent: Aug. 21, 2018

(54) SUPER HIGH PERMEANCE AND HIGH SELECTIVITY RUBBERY POLYMERIC MEMBRANES FOR SEPARATIONS

(71) Applicant: UOP LLC, Des Plaines, IL (US)

(72) Inventors: Chunqing Liu, Arlington Heights, IL (US); Nicole K. Karns, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/472,426

(22) Filed: Mar. 29, 2017

(51) Int. Cl.
| | |
|---|---|
| *B01D 53/22* | (2006.01) |
| *B01D 67/00* | (2006.01) |
| *B01D 69/14* | (2006.01) |
| *B01D 71/70* | (2006.01) |
| *C01B 3/50* | (2006.01) |
| *C10L 3/10* | (2006.01) |
| *C10G 31/00* | (2006.01) |

(52) U.S. Cl.
CPC ....... *B01D 53/228* (2013.01); *B01D 67/0013* (2013.01); *B01D 69/148* (2013.01); *B01D 71/70* (2013.01); *C01B 3/503* (2013.01); *C10G 31/00* (2013.01); *C10L 3/101* (2013.01); *C10L 3/105* (2013.01); *B01D 2323/30* (2013.01); *C01B 2203/0405* (2013.01); *C10L 2290/548* (2013.01)

(58) Field of Classification Search
CPC .. B01D 53/22; B01D 53/228; B01D 67/0013; B01D 69/148; B01D 71/70; B01D 2323/30; C01B 3/503; C10G 31/00; C10L 3/101; C10L 3/105
See application file for complete search history.

(56) References Cited

U.S. PATENT DOCUMENTS

| | | | |
|---|---|---|---|
| 3,133,132 A | 5/1964 | Sidney et al. | |
| 3,819,772 A * | 6/1974 | Kolobow ............... | B01D 71/70 264/424 |
| 4,230,463 A * | 10/1980 | Henis ..................... | B01D 53/22 210/500.23 |
| 5,733,663 A * | 3/1998 | Scheunemann ........ | B01D 71/70 210/490 |
| 6,932,589 B2 | 8/2005 | Suzuki | |
| 2010/0189631 A1* | 7/2010 | Noszticzius ........... | B01D 71/70 423/477 |
| 2011/0089110 A1* | 4/2011 | De Sitter ............. | B01D 69/148 210/640 |
| 2012/0187046 A1* | 7/2012 | Boday .................. | B01D 53/228 210/651 |
| 2014/0060324 A1* | 3/2014 | Ahn ...................... | B01D 53/228 95/51 |
| 2014/0220344 A1* | 8/2014 | Montoya ................ | C08L 83/04 428/398 |
| 2015/0020685 A1* | 1/2015 | Bhandari ............. | B01D 69/148 96/10 |
| 2016/0220967 A1* | 8/2016 | Kurahashi ............. | B01D 71/70 |

* cited by examiner

*Primary Examiner* — Jason M Greene

(57) ABSTRACT

A super high permeance and high selectivity dual layer rubbery polymeric membrane comprising a thin selective layer of a fumed silica reinforced, cross-linked polyorganosiloxane on top of a porous glassy polymer support membrane and a thin selective layer of a chemically cross-linked polyorganosiloxane rubbery polymer on top of the thin selective layer of a fumed silica reinforced, cross-linked polyorganosiloxane, and a porous glassy polymer support membrane that is formed from a glassy polymer and the processes of making these membranes and using these membranes in separating mixtures of two or more gases or liquids.

2 Claims, No Drawings

SUPER HIGH PERMEANCE AND HIGH SELECTIVITY RUBBERY POLYMERIC MEMBRANES FOR SEPARATIONS

BACKGROUND OF THE INVENTION

Over 170 Honeywell UOP Separex™ membrane systems have been installed in the world for gas separation applications such as for the removal of acid gases from natural gas, in enhanced oil recovery, and hydrogen purification. Two new Separex™ membranes (Flux+ and Select) have been commercialized recently by Honeywell UOP, Des Plaines, Ill. for carbon dioxide ($CO_2$) removal from natural gas. These Separex™ spiral wound membrane systems currently hold the membrane market leadership for natural gas upgrading. These membranes that are prepared from glassy polymers, however, do not have outstanding performance for organic vapor separations such as for olefin recovery, liquefied petroleum gas (LPG) recovery, fuel gas conditioning, natural gas dew point control, or nitrogen removal from natural gas.

Polymeric membrane materials have been found to be of use in gas separations. Numerous research articles and patents describe glassy polymeric membrane materials (e.g., polyimides, polysulfones, polycarbonates, polyamides, polyarylates, polypyrrolones) with desirable gas separation properties, particularly for use in oxygen/nitrogen separation (see, for example, U.S. Pat. No. 6,932,589). The polymeric membrane materials are typically used in processes in which a feed gas mixture contacts the upstream side of the membrane, resulting in a permeate mixture on the downstream side of the membrane with a greater mole fraction of one of the components than the composition of the original feed gas mixture. A pressure differential is maintained between the upstream and downstream sides, providing the driving force for permeation. The downstream side can be maintained as a vacuum, or at any pressure below the upstream pressure.

The separation of a polymeric membrane is based on a solution-diffusion mechanism. This mechanism involves molecular-scale interactions of the permeating gas with the polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

The relative ability of a membrane to achieve the desired separation is referred to as the separation factor or selectivity for the given mixture. There are, however, several other obstacles to use a particular polymer to achieve a particular separation under any sort of large scale or commercial conditions. One such obstacle is permeation rate or flux. One of the components to be separated must have a sufficiently high permeation rate at the preferred conditions or extraordinarily large membrane surface areas are required to allow separation of large amounts of material. Therefore, commercially available glassy polymeric membranes, such as cellulose acetate, cellulose triacetate, polyimide, and polysulfone membranes formed by phase inversion and solvent exchange methods have an asymmetric integrally skinned membrane structure. See U.S. Pat. No. 3,133,132. Such membranes are characterized by a thin, dense, selectively semipermeable surface "skin" and a less dense void-containing (or porous), non-selective support region, with pore sizes ranging from large in the support region to very small proximate to the "skin". Plasticization occurs when one or more of the components of the mixture act as a solvent in the polymer often causing it to swell and lose its membrane properties. It has been found that glassy polymers such as cellulose acetate and polyimides which have particularly good separation factors for separation of mixtures comprising carbon dioxide and methane are prone to plasticization over time thus resulting in decreasing performance of these membranes.

Natural gas often contains substantial amounts of heavy hydrocarbons and water, either as an entrained liquid, or in vapor form, which may lead to condensation within membrane modules. The gas separation capabilities of glassy polymeric membranes are affected when contacting with liquids including water and aromatic hydrocarbons such as benzene, toluene, ethylbenzene, and xylene (BTEX). The presence of more than modest levels of liquid BTEX heavy hydrocarbons is potentially damaging to traditional glassy polymeric membrane. Therefore, precautions must be taken to remove the entrained liquid water and heavy hydrocarbons upstream of the glassy polymeric membrane separation steps that typically is using an expensive membrane pretreatment system. Another issue of glassy polymeric polymer membranes that still needs to be addressed for their use in gas separations in the presence of high concentration of condensable gas or vapor such as $CO_2$ and propylene is the plasticization of the glassy polymer by these condensable gases or vapors that leads to swelling of the membrane as well as a significant increase in the permeance of all components in the feed and a decrease in the selectivity of the membranes.

Some natural gas also contains substantial amount of nitrogen ($N_2$) in additional to the heavy hydrocarbons, water, and acid gases such as $CO_2$ and hydrogen sulfide ($H_2S$). Traditional glassy polymeric membranes are relatively more permeable to $N_2$ than to methane. These membranes, however, still have low $N_2$ permeance and low $N_2/CH_4$ selectivity of <5.

For glassy polymeric gas separation membranes, permeant diffusion coefficient is more important than its solubility coefficient. Therefore, these glassy polymeric gas separation membranes preferentially permeate the smaller, less condensable gases, such as $H_2$ and $CH_4$ over the larger, more condensable gases, such as $C_3H_8$ and $CO_2$. On the other hand, in rubbery polymeric membranes such as polydimethylsiloxane membrane, permeant solubility coefficients are much more important than diffusion coefficient.

Thus, these rubbery polymeric membranes preferentially permeate the larger, more condensable gases over the smaller, less condensable gases. Polydimethylsiloxane is the most commonly used rubbery membrane material for separation of higher hydrocarbons or methane from permanent gases such as $N_2$ and $H_2$.

Most of the polyolefin (such as polypropylene (PP) and polyethylene (PE)) manufacturing plants and other polymer (such as polyvinyl chloride (PVC)) manufacturing plants use a degassing step to remove un-reacted olefins, solvents, and other additives from the raw polyolefin. Nitrogen is normally used as the stripping gas or for the polymer transfer. Disposing of the vent stream in a flare or partial recovery of the valuable olefin or other monomers via a condensing process results in the loss of valuable monomers and undesired emissions of the highly reactive volatile monomers into the air. Typically, the vent stream of the polymer reactor is compressed and then cooled to condense the monomers such as propylene and ethylene from the PP and PE reactors. The gas leaving the condenser still contains a significant amount of the monomers. One application for rubbery polymeric membranes is to recover the valuable monomers such as propylene, ethylene, and vinyl chloride and purify nitrogen for reuse from the vent stream. For olefin splitter overhead applications, the stream leaving the column overhead is primarily olefins, mixed with light gases such as $N_2$ or $H_2$. The membrane can separate the stream into an olefin-enriched stream and a light-gas-enriched stream. The olefin-enriched stream is returned to the distillation column, where the high value olefin is recovered, and the light-gas-enriched stream is vented or flared. The condensation/membrane hybrid process will achieve significantly higher olefin recovery than condensation process alone and also allows olefin recovery at moderate temperatures and pressures than condensation process. Ethylene recovery during the ethylene oxide (EO) production process to prevent the loss of valuable ethylene feedstock is another potential application of rubbery polymeric membranes. Rubbery polymeric membranes separate ethylene from argon purge gas by permeating ethylene at a much faster rate than argon to generate an ethylene-enriched permeate to be returned to the EO reactor and argon-enriched residue that will be flared.

Rubbery polymeric membranes can also be used for fuel gas conditioning that will reduce heavier hydrocarbons and increase $CH_4$ content (methane number) in the fuel gas which will be used to power upstream oil and gas operations while maintaining the pressure of the tail gas. Glassy polymeric membranes normally have very low methane permeance and also relatively low methane/heavy hydrocarbon selectivities.

Refineries are large-volume producers and consumers of hydrogen. Refinery hydrogen uses are growing due to the increased use of hydrotreating and hydrocracking. Refinery gases and various other hydrocarbon streams normally contain $H_2$, $CH_4$, ethane, ethylene, light heteroatom-containing gases and liquefied petroleum gas (LPG). Improving the recovery of $H_2$ and LPG from refinery gases could significantly improve the economics of the $H_2$-valued refinery processes such as hydrotreating, hydrocracking, and hydrodesulfurization.

SUMMARY OF THE INVENTION

This invention provides a new type of super high permeance and high selectivity dual layer rubbery polymeric membrane comprising a thin selective layer of a fumed silica reinforced, cross-linked polyorganosiloxane on top of a porous glassy polymer support membrane and a thin selective layer of a chemically cross-linked polyorganosiloxane rubbery polymer on top of the thin selective layer of a fumed silica reinforced, cross-linked polyorganosiloxane, and a porous glassy polymer support membrane that is formed from a glassy polymer selected from polyethersulfone (PES), polysulfone (PSF), polyimide (PI), cellulose acetate (CA), cellulose triacetate (CTA), polyacrylonitrile (PAN) or a mixture thereof. The fumed silica reinforced, cross-linked polyorganosiloxane is formed from an addition cure (or hydrosilylation reaction) between a fumed silica reinforced vinyl-terminated polyorganosiloxane polymer and a methylhydrosiloxane-dimethylsiloxane cross-linking copolymer in the presence of a catalyst. The chemically cross-linked polyorganosiloxane rubbery polymer is formed from chemical cross-linking between an epoxy terminated polyorganosiloxane and an amine-terminated polyorganosiloxane. The present invention also provides a method of making such super high permeance and high selectivity dual layer rubbery polymeric membranes comprising a thin selective layer of a fumed silica reinforced, cross-linked polyorganosiloxane on top of a porous glassy polymer support membrane and a thin selective layer of a chemically cross-linked polyorganosiloxane rubbery polymer on top of the thin selective layer of a fumed silica reinforced, cross-linked polyorganosiloxane, and the use of these membranes for olefin recovery from polyolefin production process, liquefied petroleum gas (LPG) recovery, natural gas liquid (NGL) recovery, $H_2$ recovery, fuel gas conditioning, natural gas dew point control, and nitrogen removal from natural gas.

The present invention also discloses the use of the new super high permeance and high selectivity dual layer rubbery polymeric membrane that is $H_2$-rejective to efficiently and cost effectively recover both $H_2$ and LPG with high recovery and high purity from refinery gases. The new super high permeance and high selectivity dual layer rubbery polymeric membrane described in the current invention separates the refinery off gas into a high pressure, high purity $H_2$ retentate stream and a low pressure, high purity LPG stream, wherein the high purity $H_2$ retentate stream has high enough purity to be recycled back to the $H_2$-valued refinery processes.

The membranes of the present invention are different from glassy polymeric membranes that are highly selective to gases with smaller kinetic diameters over larger diameter gases. The new super high permeance and high selectivity dual layer rubbery polymeric membrane comprising a thin selective layer of a fumed silica reinforced, cross-linked polyorganosiloxane on top of a porous glassy polymer support membrane and a thin selective layer of a chemically cross-linked polyorganosiloxane rubbery polymer on top of the thin selective layer of a fumed silica reinforced, cross-linked polyorganosiloxane disclosed in the present invention is highly selective to olefins and heavier hydrocarbons over methane and inert gases such as $N_2$ and $H_2$. In addition, opposite from glassy polymeric membranes, the new super high permeance and high selectivity dual layer rubbery polymeric membrane described in the current invention has improved permeance and selectivity with an increase of operating time due to the increase of plasticization of condensable olefins on the membrane or with the decrease of operating temperature. Also different from glassy polymeric membranes that are highly selective to $H_2$ with much smaller kinetic diameter than LPG gases (C3 and C3+), the new super high permeance and high selectivity dual layer $H_2$-rejective rubbery polymeric membrane disclosed in the present invention is highly selective to LPGs over $H_2$, therefore, the purified $H_2$ is maintained at high pressure in the retentate dtream of said membrane.

The porous glassy polymer support membrane formed from a glassy polymer selected from PES, PSF, PI, CA, CTA, PAN, or a mixture thereof and used for the preparation of the new super high permeance and high selectivity dual layer rubbery polymeric membrane comprising a thin selective layer of a fumed silica reinforced, cross-linked polyorganosiloxane on top of a porous glassy polymer support membrane and a second thin selective layer of a chemically cross-linked polyorganosiloxane rubbery polymer on top of the thin selective layer of a fumed silica reinforced, cross-linked polyorganosiloxane can be fabricated using a phase inversion process by casting the glassy polymer solution using a casting knife or by spinning the glassy polymer solution using a spinneret. The porous glassy polymer support membrane can be either a flat sheet support membrane or a hollow fiber support membrane. The solvents used for dissolving the glassy polymer material for the preparation of the porous glassy polymer support membrane are chosen primarily for their ability to completely dissolve the polymers, ease of solvent removal in the membrane formation steps, and their function for the formation of pores on the skin layer of the support membrane. Other considerations in the selection of solvents include low toxicity, low corrosive activity, low environmental hazard potential, availability and cost. Representative solvents include most amide solvents that are typically used for the formation of the porous glassy polymer support membrane, such as N-methylpyrrolidone (NMP) and N,N-dimethyl acetamide (DMAc), methylene chloride, tetrahydrofuran (THF), acetone, methyl acetate, isopropanol, n-octane, n-hexane, n-decane, methanol, ethanol, N,N-dimethylformamide (DMF), dimethyl sulfoxide (DMSO), lactic acid, citric acid, dioxanes, 1,3-dioxolane, glycerol, mixtures thereof, others known to those skilled in the art and mixtures thereof. Preferably, the solvents used for dissolving the glassy polymer material for the preparation of the porous glassy polymer support membrane in the current invention include N-methylpyrrolidone, 1,3-dioxolane, glycerol, and n-decane.

The thin selective layer of the fumed silica reinforced, cross-linked polyorganosiloxane on top of the porous glassy polymer support membrane in the present invention is formed by applying a dilute hydrocarbon solution of a mixture of a fumed silica reinforced vinyl-terminated polyorganosiloxane polymer and a methylhydrosiloxane-dimethylsiloxane cross-linking copolymer in the presence of a platinum complex catalyst to the top surface of the porous glassy polymer support membrane by dip-coating, spin coating, casting, soaking, spraying, painting, and other known conventional solution coating technologies. The thin selective layer of the fumed silica reinforced, cross-linked polyorganosiloxane is formed by hydrosilylation reaction between the vinyl groups on the fumed silica reinforced vinyl-terminated polyorganosiloxane polymer and the silicon hydride groups on the methylhydrosiloxane-dimethylsiloxane cross-linking copolymer after evaporating the hydrocarbon organic solvent(s) and heating at 70-150° C. for a certain time.

The thin selective layer of the chemically cross-linked polyorganosiloxane rubbery polymer on top of the thin selective layer of a fumed silica reinforced, cross-linked polyorganosiloxane in the present invention is formed by applying a dilute solution of a mixture of an epoxy-terminated polyorganosiloxane and an amine-terminated polyorganosiloxane to the top surface of the thin selective layer of a fumed silica reinforced, cross-linked polyorganosiloxane on top of the porous glassy polymer support membrane by dip-coating, spin coating, casting, soaking, spraying, painting, and other known conventional solution coating technologies. The thin selective layer of the chemically cross-linked polyorganosiloxane rubbery polymer is formed by chemical cross-linking between the epoxy-terminated polyorganosiloxane and the amine-terminated polyorganosiloxane after evaporating the hydrocarbon organic solvent(s) and heating at 70-150° C. for a sufficient time.

Permeation experimental results demonstrate that the membranes of the present invention have higher permeance for paraffins such as ethane, propane, n-butane, and olefins such as propylene, n-butene, ethylene than inert gases such as $N_2$ and $H_2$ as well as $CH_4$ and has super high permeances and selectivities for olefin and $N_2$ recovery, LPG recovery, NGL recovery, $H_2$ recovery, and fuel gas conditioning applications.

This invention discloses the use of single stage or multistage new super high permeance and high selectivity dual layer rubbery polymeric membrane comprising a thin selective layer of a fumed silica reinforced, cross-linked polyorganosiloxane on top of a porous glassy polymer support membrane and a thin selective layer of a chemically cross-linked polyorganosiloxane rubbery polymer on top of the thin selective layer of a fumed silica reinforced, cross-linked polyorganosiloxane for olefin recovery, LPG recovery, NGL recovery, $H_2$ recovery, fuel gas conditioning, natural gas dew point control, nitrogen removal from natural gas, and other suitable applications. This invention also discloses the use of the super high permeance and high selectivity dual layer rubbery polymeric membrane comprising a first thin selective layer of a fumed silica reinforced, cross-linked polyorganosiloxane on top of a porous glassy polymer support membrane and a second thin selective layer of a chemically cross-linked polyorganosiloxane rubbery polymer on top of said first thin selective layer of a fumed silica reinforced, cross-linked polyorganosiloxane described in the current invention together with a high performance Separex™ glassy polymeric membrane in a multi-stage membrane system for olefin recovery, LPG recovery, NGL recovery, fuel gas conditioning, natural gas dew point control, nitrogen removal from natural gas, etc.

DETAILED DESCRIPTION OF THE INVENTION

Membrane technology has been of great interest for the separation of gas, vapor, and liquid mixtures. However, despite significant research effort on separations by membrane technology, relatively low selectivity is still a remaining issue for rubbery polymeric membranes for separations such as for olefin recovery, LPG recovery, fuel gas conditioning, natural gas dew point control, and nitrogen removal from natural gas.

This invention discloses a new type of super high permeance and high selectivity dual layer rubbery polymeric membrane comprising a thin selective layer of a fumed silica reinforced, cross-linked polyorganosiloxane on top of a porous glassy polymer support membrane and a thin selective layer of a chemically cross-linked polyorganosiloxane rubbery polymer on top of the thin selective layer of the fumed silica reinforced, cross-linked polyorganosiloxane. The porous glassy polymer support membrane is formed from a glassy polymer selected from polyethersulfone (PES), polysulfone (PSF), polyimide (PI), cellulose acetate (CA), cellulose triacetate (CTA), polyacrylonitrile (PAN), or a mixture thereof. The fumed silica reinforced, cross-linked polyorganosiloxane is formed from addition cure (or hydrosilylation reaction) between a fumed silica reinforced vinyl-terminated polyorganosiloxane polymer and a methylhydrosiloxane-dimethylsiloxane cross-linking copolymer in the presence of a catalyst. The chemically cross-linked polyorganosiloxane rubbery polymer is formed from chemical cross-linking between an epoxy-terminated polyorganosiloxane and an amine-terminated polyorganosiloxane. The present invention also discloses a method of making such super high permeance and high selectivity dual layer rubbery polymeric membranes comprising a thin selective layer of a fumed silica reinforced, cross-linked polyorganosiloxane on top of a porous glassy polymer support membrane and a thin selective layer of a chemically cross-linked polyorganosiloxane rubbery polymer on top of said first thin selective layer of a fumed silica reinforced, cross-linked polyorganosiloxane, and the use of these membranes for olefin recovery from polyolefin production process, LPG recovery, NGL recovery, $H_2$ recovery, fuel gas conditioning, natural gas dew point control, and nitrogen removal from natural gas.

Different from glassy polymeric membranes that are highly selective to gases with smaller kinetic diameters over larger diameter gases, the new type of super high permeance and high selectivity dual layer rubbery polymeric membrane comprising a thin selective layer of a fumed silica reinforced, cross-linked polyorganosiloxane on top of a porous glassy polymer support membrane and a thin selective layer of a chemically cross-linked polyorganosiloxane rubbery polymer on top of the thin selective layer of a fumed silica reinforced, cross-linked polyorganosiloxane is highly selective to olefins and heavier hydrocarbons over methane and inert gases such as $N_2$ and $H_2$. In addition, these membranes exhibit opposite properties from glassy polymeric membranes in that the membranes of the present invention have improved permeance and selectivity with an increase of operating time due to the increase of plasticization of condensable olefins on the membranes or with the decrease of operating temperature.

The porous glassy polymer support membrane can be formed from any glassy polymer that has good film forming properties such as PES, PSF, PI, PAN, a blend of PES and PI, a blend of PSF and PI, and a blend of CA and CTA for the preparation of the new type of super high permeance and high selectivity dual layer rubbery polymeric membrane comprising a first thin selective layer of a fumed silica reinforced, cross-linked polyorganosiloxane on top of a porous glassy polymer support membrane and a second thin selective layer of a chemically cross-linked polyorganosiloxane rubbery polymer on top of said first thin selective layer of a fumed silica reinforced, cross-linked polyorganosiloxane disclosed in the present invention. The porous glassy polymer support membrane described in the present invention is fabricated using a phase inversion process by casting the glassy polymer solution using a casting knife or bying spinning the glassy polymer solution using a spinneret. The porous glassy polymer support membrane described in the current invention can be either asymmetric integrally skinned membrane or thin film composite membrane with either flat sheet (spiral wound) or hollow fiber geometry.

The current invention discloses the use of a porous glassy polymer support membrane for the preparation of the new super high permeance and high selectivity dual layer rubbery polymeric membrane comprising a first thin selective layer of a fumed silica reinforced, cross-linked polyorganosiloxane on top of a porous glassy polymer support membrane and a second thin selective layer of a chemically cross-linked polyorganosiloxane rubbery polymer on top of said first thin selective layer of a fumed silica reinforced, cross-linked polyorganosiloxane. The porous glassy polymer support membrane for the preparation of the new super high permeance and high selectivity dual layer rubbery polymeric membrane comprising a first thin selective layer of a fumed silica reinforced, cross-linked polyorganosiloxane on top of a porous glassy polymer support membrane and a second thin selective layer of a chemically cross-linked polyorganosiloxane rubbery polymer on top of the thin selective layer of a fumed silica reinforced, cross-linked polyorganosiloxane has a carbon dioxide permeance of at least 100 GPU and no carbon dioxide/methane selectivity at 50° C. under 20-100 psig 10% $CO_2$/90% $CH_4$ mixed gas feed pressure.

The solvents used for dissolving the glassy polymer material for the preparation of the porous glassy polymer support membrane are chosen primarily for their ability to completely dissolve the polymers, ease of solvent removal in the membrane formation steps, and their function for the formation of small pores on the skin layer of the support membrane. Other considerations in the selection of solvents include low toxicity, low corrosive activity, low environmental hazard potential, availability and cost. Representative solvents include most amide solvents that are typically used for the formation of the porous glassy polymer support membrane, such as N-methylpyrrolidone (NMP) and N,N-dimethyl acetamide (DMAc), methylene chloride, tetrahydrofuran (THF), acetone, methyl acetate, isopropanol, n-octane, n-hexane, n-decane, methanol, ethanol, N,N-dimethylformamide (DMF), dimethyl sulfoxide (DMSO), lactic acid, citric acid, dioxanes, 1,3-dioxolane, glycerol, mixtures thereof, others known to those skilled in the art and mixtures thereof. Preferably, the solvents used for dissolving the glassy polymer material for the preparation of the porous glassy polymer support membrane in the current invention include NMP, 1,3-dioxolane, glycerol, and n-decane.

The thin selective layer of the fumed silica reinforced, cross-linked polyorganosiloxane on top of the porous glassy polymer support membrane is formed by applying a dilute hydrocarbon solution of a mixture of a fumed silica reinforced vinyl-terminated polyorganosiloxane polymer and a methylhydrosiloxane-dimethylsiloxane cross-linking copolymer in the presence of a platinum complex catalyst to the top surface of the porous glassy polymer support membrane by dip-coating, spin coating, casting, soaking, spraying, painting, and other known conventional solution coating technologies. The thin selective layer of the fumed silica reinforced, cross-linked polyorganosiloxane is formed by hydrosilylation reaction between the vinyl groups on the fumed silica reinforced vinyl-terminated polyorganosiloxane polymer and the silicon hydride groups on the methylhydrosiloxane-dimethylsiloxane cross-linking copolymer after evaporating the hydrocarbon organic solvent(s) and heating at 70-150° C. for a sufficient time.

The thin selective layer of the chemically cross-linked polyorganosiloxane rubbery polymer on top of the thin selective layer of a fumed silica reinforced, cross-linked polyorganosiloxane in the present invention is formed by applying a dilute hydrocarbon solution of a mixture of an epoxy-terminated polyorganosiloxane and an amine-terminated polyorganosiloxane to the top surface of the thin selective layer of the fumed silica reinforced, cross-linked polyorganosiloxane on top of the porous glassy polymer support membrane by dip-coating, spin coating, casting, soaking, spraying, painting, and other known conventional solution coating technologies. The thin selective layer of the chemically cross-linked polyorganosiloxane rubbery polymer is formed by chemical cross-linking between the epoxy-terminated polyorganosiloxane and the amine-terminated polyorganosiloxane after evaporating the hydrocarbon organic solvent(s) and heating at 70-150° C. for a sufficient time.

The thin selective layer of the fumed silica reinforced, cross-linked polyorganosiloxane on top of the porous glassy polymer support membrane provides the membrane with not only super high permeance, but also a smooth membrane surface for the formation of the second thin selective layer of a chemically cross-linked polyorganosiloxane rubbery polymer. The thin selective layer of the fumed silica reinforced, cross-linked polyorganosiloxane on top of the porous glassy polymer support membrane described in the present invention also prevents the penetration of the epoxy-terminated polyorganosiloxane and the amine-terminated polyorganosiloxane into the pores of the porous glassy polymer support membrane during the formation of the second thin selective layer of the chemically cross-linked polyorganosiloxane rubbery polymer, which results in the formation of the second thin, defect-free, highly selective layer of the chemically cross-linked polyorganosiloxane rubbery polymer. A vinyl-terminated polyorganosiloxane polymer such as vinylmethylsiloxane-dimethylsiloxane and vinylphenylsiloxane-dimethylsiloxane that is used for the preparation of the first thin selective layer of the fumed silica reinforced, cross-linked polyorganosiloxane is reinforced by fumed silica fillers such as hexamethyldisilazane treated fumed silica fillers. The incorporation of the fumed silica fillers into the first thin selective layer of the fumed silica reinforced, cross-linked polyorganosiloxane on top of the porous glassy polymer support membrane described in the present invention prevents deep penetration of the vinyl-terminated polyorganosiloxane polymer and the methylhydrosiloxane-dimethylsiloxane cross-linking copolymer into the pores of the porous glassy polymer support membrane during the formation of the first thin selective layer of the fumed silica reinforced, cross-linked polyorganosiloxane.

The organic solvents that can be used for dissolving the vinyl-terminated polyorganosiloxane, vinylorganosiloxane-dimethylsiloxane copolymer, methylhydrosiloxane-dimethylsiloxane cross-linking copolymer, epoxy-terminated polyorganosiloxane, and the amine-terminated polyorganosiloxane are hydrocarbons such as n-heptane, n-hexane, n-octane, or mixtures thereof. It is preferred that these rubbery polymers are diluted in the hydrocarbon organic solvent or mixtures thereof in a concentration of from about 1 to about 20 wt %.

The platinum complex catalyst used for the formation of the first thin selective layer of the fumed silica reinforced, cross-linked polyorganosiloxane on top of the porous glassy polymer support membrane in the present invention can be a platinum compound catalyst that is soluble in the reaction mixture such as platinum carbonylcyclovinylmethylsiloxane complex, platinum divinyltetramethyldisiloxane complex, and platinum cyclovinylmethylsiloxane complex.

The amine-terminated polyorganosiloxane used for the preparation of the thin selective layer of the chemically cross-linked polyorganosiloxane rubbery polymer can be selected from amine-terminated polyorganosiloxane, aminoorganomethylsiloxane-dimethylsiloxane copolymer, or a mixture thereof. An example of the amine-terminated polyorganosiloxane is aminopropyl-terminated polydimethylsiloxane as shown in formula (I)

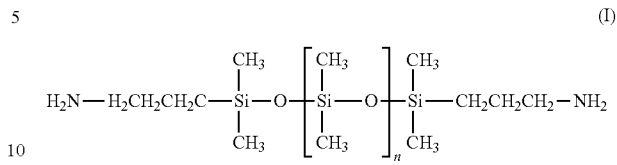

wherein n is an integer from 10 to 1000. The aminoorganomethylsiloxane-dimethylsiloxane copolymer comprises a plurality of a repeating units of formula (II)

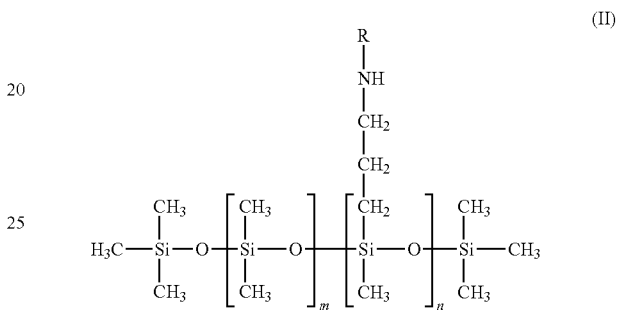

wherein —R is —H or —CH$_2$CH$_2$NH$_2$, wherein n and m are independent integers from 2 to 1000 and the molar ratio of n to m is in a range of 1:500 to 1:5.

The epoxy-terminated polyorganosiloxane used for the preparation of the thin selective layer of the chemically cross-linked polyorganosiloxane rubbery polymer can be selected from epoxy-terminated polyorganosiloxane, epoxycyclohexylmethylsiloxane-dimethylsiloxane copolymer, or a mixture thereof. An example of the epoxy-terminated polyorganosiloxane is epoxypropoxypropyl-terminated polydimethylsiloxane as shown in formula (III)

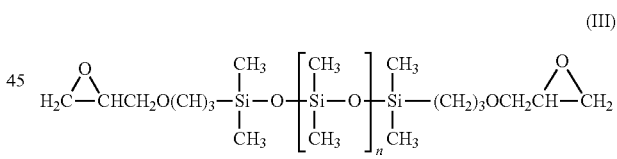

wherein n is an integer from 0 to 500. The epoxycyclohexylmethylsiloxane-dimethylsiloxane copolymer comprises a plurality of a repeating units of formula (IV)

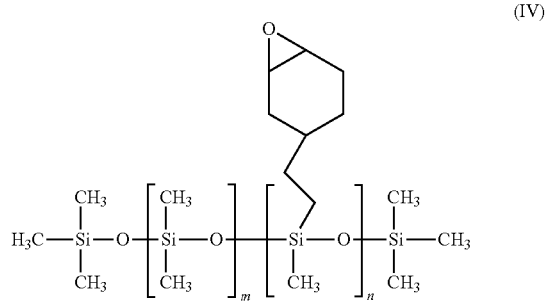

wherein n and m are independent integers from 2 to 1000 and the molar ratio of n to m is in a range of 1:500 to 1:5.

The present invention also provides a method of making the new type of super high permeance and high selectivity dual layer rubbery polymeric membrane comprising a first thin selective layer of a fumed silica reinforced, cross-linked polyorganosiloxane on top of a porous glassy polymer support membrane and a second thin selective layer of a chemically cross-linked polyorganosiloxane rubbery polymer on top of said first thin selective layer of a fumed silica reinforced, cross-linked polyorganosiloxane comprising: a) preparation of a porous support membrane from a glassy polymer such as polyethersulfone (PES), polysulfone (PSF), polyimide (PI), polyacrylonitrile (PAN), a blend of PES and PI, a blend of PSF and PI, and a blend of cellulose acetate (CA) and cellulose triacetate (CTA) via a phase inversion membrane fabrication process; b) applying a dilute hydrocarbon solution of a mixture of a fumed silica reinforced vinyl-terminated polyorganosiloxane polymer and a methylhydrosiloxane-dimethylsiloxane cross-linking copolymer in the presence of a platinum complex catalyst to the top surface of the porous glassy polymer support membrane by dip-coating, spin coating, casting, soaking, spraying, painting, and other known conventional solution coating technologies; c) evaporating the hydrocarbon organic solvents on said membrane and heating the coated membrane at 70-150° C. for a sufficient time to form a thin selective layer of the fumed silica reinforced, cross-linked polyorganosiloxane on top of the porous glassy polymer support membrane; d) applying a dilute hydrocarbon solution of a mixture of an epoxy-terminated polyorganosiloxane and an amine-terminated polyorganosiloxane to the top surface of the first thin selective layer of the fumed silica reinforced, cross-linked polyorganosiloxane on top of the porous glassy polymer support membrane by dip-coating, spin coating, casting, soaking, spraying, painting, and other known conventional solution coating technologies; e) evaporating the hydrocarbon organic solvents on said membrane and heating the coated membrane at 70-150° C. for a sufficient time to form a second thin selective layer of the chemically cross-linked polyorganosiloxane rubbery polymer on top of the first thin selective layer of a fumed silica reinforced, cross-linked polyorganosiloxane.

The super high permeance and high selectivity dual layer rubbery polymeric membranes comprising a first thin selective layer of a fumed silica reinforced, cross-linked polyorganosiloxane on top of a porous glassy polymer support membrane and a second thin selective layer of a chemically cross-linked polyorganosiloxane rubbery polymer on top of the first thin selective layer of a fumed silica reinforced, cross-linked polyorganosiloxane described in the present invention can be fabricated into any convenient form suitable for a desired separation application. For example, the membranes can be in the form of hollow fibers, tubes, flat sheets, and the like. The super high permeance and high selectivity dual layer rubbery polymeric membrane can be assembled in a separator in any suitable configuration for the form of the membrane and the separator may provide for co-current, counter-current, or cross-current flows of the feed on the retentate and permeate sides of the membrane. In one exemplary embodiment, the new super high permeance and high selectivity dual layer rubbery polymeric membrane is in a spiral wound module that is in the form of flat sheet having a thickness from about 30 to about 400 µm. In another exemplary embodiment, the new super high permeance and high selectivity dual layer rubbery polymeric membrane is in a hollow fiber module that is in the form of thousands, tens of thousands, hundreds of thousands, or more, of parallel, closely-packed hollow fibers or tubes. In one embodiment, each fiber has an outside diameter of from about 200 micrometers (µm) to about 700 millimeters (mm) and a wall thickness of from about 30 to about 200 µm. In operation, a feed contacts a first surface of said super high permeance and high selectivity dual layer rubbery polymeric membrane described in the present invention, a permeate permeates said membrane described in the present invention and is removed therefrom, and a retentate, not having permeated said membrane described in the present invention, also is removed therefrom. In another embodiment, the super high permeance and high selectivity dual layer rubbery polymeric membrane described in the present invention can be in the form of flat sheet having a thickness in the range of from about 30 to about 400 µm.

The new super high permeance and high selectivity dual layer rubbery polymeric membrane disclosed in the present invention has higher permeance for paraffins such as ethane, propane, n-butane, and olefins such as propylene, n-butene, ethylene than inert gases such as $N_2$ and $H_2$ as well as $CH_4$ and has significantly higher selectivities for olefin/nitrogen, hydrocarbon/nitrogen, olefin/hydrogen, hydrocarbon/hydrogen, and C2+ hydrocarbon/methane than a thermally cross-linked RTV615A/B silicone rubber membrane and UV cross-linked epoxysilicone rubbery membrane for olefin and $N_2$ recovery and LPG recovery applications.

This invention discloses the use of single stage or multi-stage new super high permeance and high selectivity dual layer rubbery polymeric membrane described in the current invention for olefin recovery, LPG recovery, NGL recovery, $H_2$ recovery, fuel gas conditioning, natural gas dew point control, nitrogen removal from natural gas, etc. This invention also discloses the use of new super high permeance and high selectivity dual layer rubbery polymeric membrane described in the current invention together with a high performance Separex glassy polymeric membrane in a multi-stage membrane system for applications including olefin recovery, LPG recovery, fuel gas conditioning, natural gas dew point control, nitrogen and acid gas removal from natural gas.

This invention also discloses the use of a single stage or multi-stage new super high permeance and high selectivity dual layer rubbery polymeric membrane with high $H_2$ rejection, much higher LPG/$H_2$ selectivity, and higher LPG permeance than the traditional polydimethylsiloxane rubbery polymeric gas separation membrane for efficient and effective recovery of both $H_2$ and LPG with high recovery and high purity from refinery gases. The high LPG/$H_2$ selectivity for the new super high permeance and high selectivity dual layer rubbery polymeric membrane described in the current invention will provide much higher purity $H_2$ retentate stream and also much higher purity LPG permeate stream. More importantly, the purified $H_2$ remains in the high pressure retentate stream that can be recycled back to the refinery process without the use of high cost compressor.

EXAMPLES

The following examples are provided to illustrate one or more preferred embodiments of the invention, but are not limited embodiments thereof. Numerous variations can be made to the following examples that lie within the scope of the invention.

Comparative Example 1

Preparation of 5RTVSi/PES-a Rubbery Membrane

A porous, asymmetric polyethersulfone (PES) gas separation support membrane was prepared via the phase-inversion process. A PES-a membrane casting dope comprising PES 18-25 wt %, NMP 60-65 wt %, 1,3-dioxolane 10-15 wt %, glycerol 1-10 wt % and n-decane 0.5-2 wt % was cast on a nylon fabric then gelled by immersion in a 1° C. water bath for about 10 minutes, and then annealed in a hot water bath at 85° C. for about 5 minutes. The wet membrane was dried at 70° C. The dried PES-a porous support membrane was coated with an RTVSi silicone rubber precursor polymer solution comprising RTV615A, RTV615B, and hexane (RTV615A:RTV615B=9:1 (weight ratio), 5 wt % of RTV615A+RTV615B in hexane) and then thermally cross-linked at 85° C. for 1 h to form a thin, nonporous, dense RTVSi selective layer on the surface of the PES-a support membrane (abbreviated as 5RTVSi/PES-a). The 5RTVSi/PES-a membrane was tested with $N_2$, $H_2$, $CH_4$, propylene, and propane single gases at 791 kPa (100 psig) and 25° C.

Example 1

Preparation of 5DMS-Si/8DMS-A-DMS-E/PES-b Membrane

A porous, asymmetric PES gas separation support membrane (PES-b) was prepared via the phase-inversion process. A PES-b membrane casting dope comprising PES 20-25 wt %, NMP 60-65 wt %, 1,3-dioxolane 10-15 wt %, glycerol 1-10 wt % and n-decane 0.5-2 wt % was cast on a nylon fabric then gelled by immersion in a 1° C. water bath for about 10 minutes, and then annealed in a hot water bath at 85° C. for about 5 minutes. The wet membrane was dried at 70° C. A 5 wt % DMS-Si pre-cross-linked rubbery polymer solution was prepared by dissolving 6.3 g of fumed silica reinforced vinyl-terminated polydimethylsiloxane (Gelest catalog number: DMS-V31 S 15) and 0.7 g of RTV615B (Momentive) in 133 g of hexane at room temperature for about 30 min. The dried PES-b porous support membrane was coated with the 5 wt % DMS-Si pre-cross-linked polydimethylsiloxane polymer solution, dried at room temperature for about 5 min, and then heated at 85° C. for 1.5-2 h to form a first thin, nonporous, dense, cross-linked fumed silica reinforced DMS-Si selective layer on the surface of the PES-b support membrane. An 8 wt % DMS-A-DMS-E pre-cross-linked rubbery polymer solution was prepared by dissolving 2.0 g of an aminopropyl-terminated polydimethylsiloxane (Gelest catalog number: DMS-A21) and 3.0 g of an epoxy-terminated polydimethylsiloxane (Gelest catalog number: DMS-E21) in 57.5 g of hexane at room temperature for about 10 min. The DMS-Si-coated PES-b membrane was coated with the 8 wt % DMS-A-DMS-E pre-cross-linked rubbery polymer solution, dried at room temperature for about 5 min, and then heated at 85° C. for 1 h to form a second thin, nonporous, dense, chemically cross-linked DMS-A-DMS-E selective layer on the surface of the DMS-Si-coated PES-b membrane (abbreviated as 5DMS-Si/8DMS-A-DMS-E/PES-b). The 5DMS-Si/8DMS-A-DMS-E/PES-b membrane was tested with $N_2$, $H_2$, $CH_4$, propylene, and propane single gases at 791 kPa (100 psig) and 25° C.

The new super high permeance and high selectivity dual layer rubbery polymeric membrane 5DMS-Si/8DMS-A-DMS-E/PES-b disclosed in the current invention showed both higher C3 permeance and more than doubled $C_3/H_2$ selectivity than 5RTVSi/PES-a rubbery polymeric membrane. This significantly higher $C3/H_2$ selectivity for the new 5DMS-Si/8DMS-A-DMS-E/PES-b membrane provides much higher purity $H_2$ retentate stream and also much higher purity LPG permeate stream. More importantly, the purified $H_2$ remains in the high pressure retentate stream that can be recycled back to the refinery process without the use of high cost compressor.

TABLE 1

Pure gas permeation results for 5RTVSi/PES-a and 5DMS-Si/8DMS-A-DMS-E/PES-b membranes for propylene recovery (propylene ($C_{3=}$)/$N_2$ and $C_{3=}/H_2$ separations)*

| Membrane | $P_{C3=}/L$ (GPU) | $\alpha_{C3=/N2}$ | $\alpha_{C3=/H2}$ |
|---|---|---|---|
| 5RTVSi/PES-a | 2881 | 31.8 | 10.3 |
| 5DMS-Si/8DMS-A-DMS-E/PES-b | 3277 | 52.5 | 22.2 |

*Tested at room temperature and 791 kPa (100 psig); 1 GPU = $10^{-6}$ $cm^3(STP)/cm^2 \cdot sec \cdot cmHg$

TABLE 2

Pure gas permeation results for 5RTVSi/PES-a and 5DMS-Si/8DMS-A-DMS-E/PES-b membranes for liquid petroleum gas (LPG) recovery (propane ($C_3$)/$N_2$ and $C_3/H_2$ separations)*

| Membrane | $P_{C3}/L$ (GPU) | $\alpha_{C3/N2}$ | $\alpha_{C3/H2}$ |
|---|---|---|---|
| 5RTVSi/PES-a | 3093 | 34.2 | 11.1 |
| 5DMS-Si/8DMS-A-DMS-E/PES-b | 3597 | 57.6 | 24.4 |

*Tested at room temperature and 791 kPa (100 psig); 1 GPU = $10^{-6}$ $cm^3(STP)/cm^2 \cdot sec \cdot cmHg$

SPECIFIC EMBODIMENTS

While the following is described in conjunction with specific embodiments, it will be understood that this description is intended to illustrate and not limit the scope of the preceding description and the appended claims.

A first embodiment of the invention is a process comprising a thin selective layer of a fumed silica reinforced, cross-linked polyorganosiloxane on top of a porous glassy polymer support membrane and a thin selective layer of a chemically cross-linked polyorganosiloxane rubbery polymer on top of the thin selective layer of the fumed silica reinforced, cross-linked polyorganosiloxane. An embodiment of the invention is one, any or all of prior embodiments in this paragraph up through the first embodiment in this paragraph wherein the porous glassy polymer support membrane is a polymer selected from the group consisting of polyethersulfone, polysulfone, polyimide, polyacrylonitrile, cellulose acetate, cellulose triacetate, and mixtures thereof. An embodiment of the invention is one, any or all of prior embodiments in this paragraph up through the first embodiment in this paragraph wherein the fumed silica reinforced, cross-linked polyorganosiloxane is reinforced by fumed silica fillers. An embodiment of the invention is one, any or all of prior embodiments in this paragraph up through the first embodiment in this paragraph wherein the fumed silica filler comprises hexamethyldisilazane.

A second embodiment of the invention is a process of making a rubbery polymeric membrane comprising applying a layer of a fumed silica reinforced, cross-linked polyorganosiloxane on top of a porous glassy polymer support membrane and a layer of a chemically cross-linked polyorganosiloxane rubbery polymer on top of the layer of the fumed silica reinforced, cross-linked polyorganosiloxane.

An embodiment of the invention is one, any or all of prior embodiments in this paragraph up through the second embodiment in this paragraph wherein the fumed silica reinforced, cross-linked polyorganosiloxane is formed by applying a dilute hydrocarbon solution of a mixture of a fumed silica reinforced vinyl-terminated polyorganosiloxane polymer and a methylhydrosiloxane-dimethylsiloxane cross-linking copolymer in the presence of a platinum complex catalyst to a top surface of the porous glassy polymer support membrane. An embodiment of the invention is one, any or all of prior embodiments in this paragraph up through the second embodiment in this paragraph wherein the layer of the chemically cross-linked polyorganosiloxane rubbery polymer on top of the thin selective layer of a fumed silica reinforced, cross-linked polyorganosiloxane in the present invention is formed by applying a dilute solution of a mixture of an epoxy-terminated polyorganosiloxane and an amine-terminated polyorganosiloxane to a top surface of the thin selective layer of the fumed silica reinforced, cross-linked polyorganosiloxane. An embodiment of the invention is one, any or all of prior embodiments in this paragraph up through the second embodiment in this paragraph further comprising evaporating hydrocarbon organic solvents and heating at 70 to 150° C. to complete formation of the chemically cross-linked polyorganosiloxane rubbery polymer. An embodiment of the invention is one, any or all of prior embodiments in this paragraph up through the second embodiment in this paragraph wherein the vinyl-terminated polyorganosiloxane and methylhydrosiloxane-dimethylsiloxane cross-linking copolymer are dissolved in a solvent selected from the group consisting of such as n-heptane, n-hexane, n-octane, and mixtures thereof. An embodiment of the invention is one, any or all of prior embodiments in this paragraph up through the second embodiment in this paragraph wherein the platinum complex is a platinum compound catalyst that is soluble in a reaction mixture selected from the group consisting of platinum carbonylcyclovinylmethylsiloxane complex, platinum divinyltetramethyldisiloxane complex, and platinum cyclovinylmethylsiloxane complex. An embodiment of the invention is one, any or all of prior embodiments in this paragraph up through the second embodiment in this paragraph wherein the epoxy-terminated polyorganosiloxane and amine-terminated polyorganosiloxane are dissolved in a solvent selected from the group consisting of such as n-heptane, n-hexane, n-octane, and mixtures thereof. An embodiment of the invention is one, any or all of prior embodiments in this paragraph up through the second embodiment in this paragraph wherein the amine-terminated polyorganosiloxane is selected from the group consisting of amine-terminated polyorganosiloxane, aminoorganomethylsiloxane-dimethylsiloxane copolymer and mixtures thereof. An embodiment of the invention is one, any or all of prior embodiments in this paragraph up through the second embodiment in this paragraph wherein the amine-terminated polyorganosiloxane is aminopropyl-terminated polydimethylsiloxane as shown in formula (I)

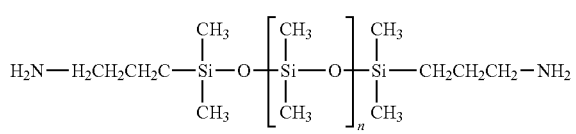

(I)

wherein n is an integer from 10 to 1000. An embodiment of the invention is one, any or all of prior embodiments in this paragraph up through the second embodiment in this paragraph wherein the aminoorganomethylsiloxane-dimethylsiloxane copolymer comprises a plurality of a repeating units of formula (II)

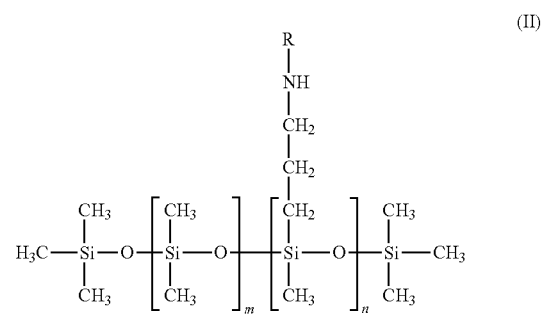

(II)

wherein —R is —H or —CH$_2$CH$_2$NH$_2$, wherein n and m are independent integers from 2 to 1000 and the molar ratio of n to m is in a range of 1500 to 15.

A third embodiment of the invention is a process for separating a mixture comprising contacting the mixture to a membrane comprising a thin selective layer of a fumed silica reinforced, cross-linked polyorganosiloxane on top of a porous glassy polymer support membrane and a thin selective layer of a chemically cross-linked polyorganosiloxane rubbery polymer on top of the thin selective layer of the fumed silica reinforced, cross-linked polyorganosiloxane. An embodiment of the invention is one, any or all of prior embodiments in this paragraph up through the third embodiment in this paragraph wherein the mixture comprises a mixture selected from the group consisting of olefin/nitrogen, hydrocarbon/nitrogen, olefin/hydrogen, hydrocarbon/hydrogen, and C2+ hydrocarbon/methane. An embodiment of the invention is one, any or all of prior embodiments in this paragraph up through the third embodiment in this paragraph wherein the membrane is used to separate a mixture as part of a process selected from the group consisting of olefin recovery, liquefied petroleum gas recovery, hydrogen recovery, fuel gas conditioning, natural gas dew point control, and nitrogen removal from natural gas.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process of making a rubbery polymeric membrane comprising applying a layer of a fumed silica reinforced, cross-linked polyorganosiloxane on top of a porous glassy polymer support membrane and a layer of a chemically cross-linked polyorganosiloxane rubbery polymer on top of the layer of the fumed silica reinforced, cross-linked polyorganosiloxane wherein the layer of the chemically cross-linked polyorganosiloxane rubbery polymer on top of the layer of the fumed silica reinforced, cross-linked polyorganosiloxane is formed by applying a dilute solution of a mixture of an epoxy-terminated polyorganosiloxane and an amine-terminated polyorganosiloxane to a top surface of the layer of the fumed silica reinforced, cross-linked polyorganosiloxane and wherein said amine-terminated polyorganosiloxane is an aminoorganomethylsiloxane-dimethylsiloxane copolymer comprising a plurality of repeating units of formula (II)

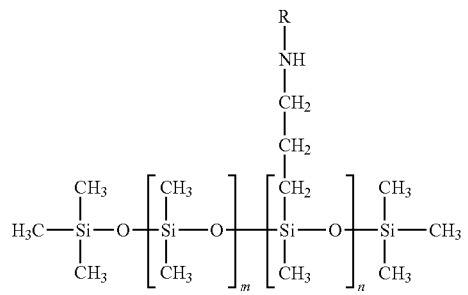

wherein —R is —H or —CH$_2$CH$_2$NH$_2$, wherein n and m are independent integers from 2 to 1000 and the molar ratio of n to m is in a range of 1:500 to 1:5.

2. The process of claim 1 further comprising evaporating hydrocarbon organic solvents and heating at 70 to 150° C. to complete formation of the chemically cross-linked polyorganosiloxane rubbery polymer.